March 24, 1953  H. WURZEL  2,632,221
SEPARABLE FASTENER

Filed Nov. 3, 1950  2 SHEETS—SHEET 1

Inventor
HUGO WURZEL,
By [signature]
Attorney

March 24, 1953 H. WURZEL 2,632,221
SEPARABLE FASTENER

Filed Nov. 3, 1950 2 SHEETS—SHEET 2

Inventor
HUGO WURZEL,
By J. Harold Kilcoyne
Attorney

Patented Mar. 24, 1953

2,632,221

UNITED STATES PATENT OFFICE 2,632,221

SEPARABLE FASTENER

Hugo Wurzel, Bronx, N. Y., assignor to Waldes Kohinoor, Inc., Long Island City, N. Y., a corporation of New York Application November 3, 1950, Serial No. 193,873

11 Claims. (Cl. 24—217)

This invention relates to improvements in separable fasteners, and more particularly to an improved stud and socket type of separable fastener wherein the stud and socket members are connected by a coupling spring which normally locks said members together and are released by overcoming the pressure of the coupling spring. Although not limited thereto, a separable fastener according to the invention is especially adapted for securing a fuel cell or tank to the fuselage or frame of an airplane.

To be suitable for this purpose, the fastener must have a number of properties which, in their combination, are not usually required of a fastener used in other assemblies. For example, the fastener must have extreme lightness in weight; it is required to withstand considerable axial thrusts and twisting forces; the coupling and uncoupling operations are required to be effected in the simplest possible manner from the inside of the fuel cell; and the socket member should be adjustable with respect to the part to which it is affixed so as to be readily alignable with the stud member to facilitate insertion of the stud member into the socket member.

It is a broad object of the present invention to provide a separable fastener which will meet all of the aforementioned requirements, and which at the same time is inexpensive in manufacture and installation.

A more specific object of the invention is the provision of a separable fastener comprising a stud member, a socket member, and a coupling spring which normally lock said members together, wherein coupling of said members is effected by the simple act of bringing said members together in axial direction, and uncoupling is effected by pressure applied to said parts in the same axial direction required for their assembly and thence by relative movement of said members in a lateral direction.

A further object of the invention is the provision of a separable fastener constructed and organized as in the foregoing, incorporating means for positively precluding radial spreading of the coupling spring following its seating in the stud groove, but which permits the spring to be readily spread during the operations of assembling and disassembling the stud and socket members, when spreading of the spring is necessary.

Yet another object of the invention is the provision of a separable fastener characterized as in the foregoing, wherein the coupling spring is mounted for limited axial movement within the socket member, and the latter is so constructed that when the coupling spring is disposed in one axial portion thereof it is positively locked, and when the coupling spring is shifted axially within the socket member, it may spread as required to effect separation of the stud and socket members.

Still another object of the invention is the provision of a separable fastener characterized as in the foregoing, which incorporates means permitting lateral adjustment of the socket member as required to bring its axis into alignment with the axis of the stud member, thus facilitating insertion of the stud member into the socket member.

The above and other objects and features of advantage of a separable fastener according to the invention will be seen from the following detailed description thereof, in conjunction with the accompanying drawings, in which—

Figure 2:
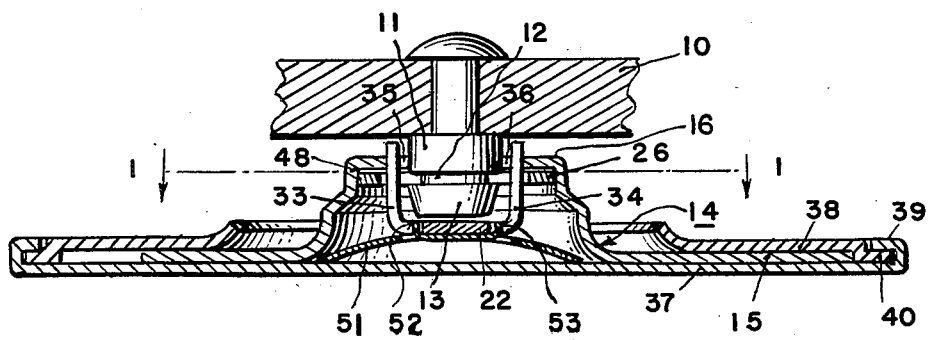
Fig. 2 is a transverse section taken along line 2—2 of Fig. 1, which illustrates the stud and fastener members in their full locked position.
Figure 3:
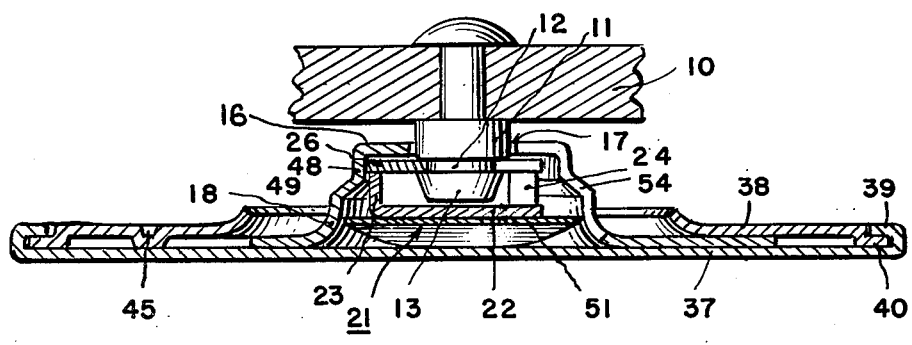
Fig. 3 is a section taken on line 3—3 of Fig. 1 also showing the stud and socket members in their full locked position.
Figure 4:
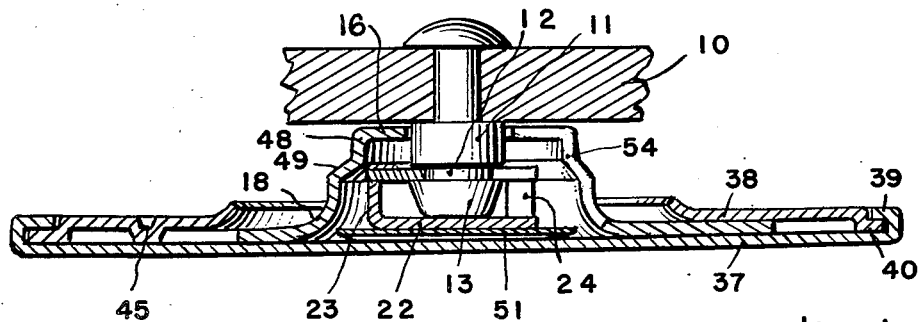
Fig. 4 is a section similar to Fig. 3, but illustrating the stud and socket members in their relative positions allowing spreading of the coupling spring preliminary to separation of said members.

In the drawings, reference numeral 10 designates one of the parts to be fastened, which may be the fixed fuselage or frame of an airplane. Riveted or otherwise rigidly connected to the fuselage is a stud member 11 provided intermediate its ends with a circular groove 12 and whose inserting end is preferably formed as a frusto-conical point 13 for ready insertion into the socket member of the fastener. Said socket member, generally designated 14, has inverted cup-like shape and comprises an annular base flange 15 and a top plate 16 having a central opening 17 for insertion of the stud member and being integrally connected to the base flange 15 by a generally cylindrical side wall 18. As seen in Figs. 2, 3 and 4, the cylindrical side wall 18 has substantial vertical height, thus providing the socket member with a substantial axial dimension for the purpose to be explained.

Figure 1:
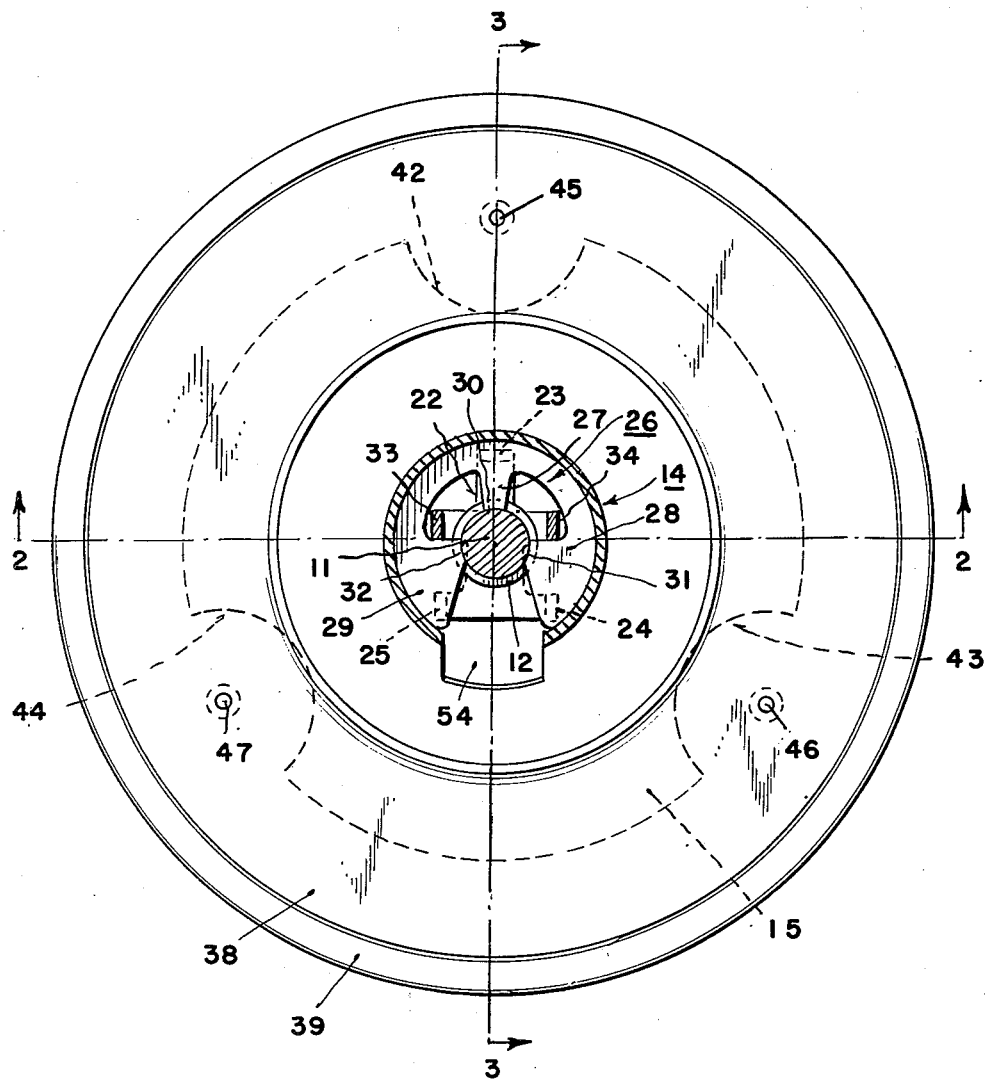
Fig. 1 is a plan view of the separable fastener of this invention, partly in section taken on line 1—1 of Fig. 2.

Disposed within the socket member 14 is a horizontal supporting member 21 comprising a base 22 and integral tongues 23, 24, 25 extending upwardly and substantially normally to said base, on the end edges of which rests a coupling spring 26, the supporting member thus serving as a carrier for said coupling spring. The coupling spring 26 has the form of an open-ended annular retaining ring which is adapted to be assembled transversely on its shaft, in this case, the stud member 11. The preferred form of the coupling spring is shown in Fig. 1, from which it will be observed that the ring body of the spring has an uninterrupted arcuate outer circumference, while from the inner circumference extend three equally spaced protrusions 27, 28 and 29, the inner edges 30, 31 and 32 of which lie on a circle having substantially the same diameter as the bottom of the stud groove 12.

The supporting member 21 is also provided with upstanding arms 33, 34 extending parallel to the longitudinal axis of the socket (Fig. 2), said arms extending through the open spaces between the inner circular edge and the radial edges of the protrusions 28, 29 of the coupling spring 26 (Fig. 1) and thence through apertures 35, 36 in the top or cover plate 16 of the socket member 14, which apertures may be formed separate from the central opening 17, or they may be formed as a part thereof as shown in Fig. 2. Accordingly, the arms 33, 34 lock the supporting member 21 and the coupling spring 26 against rotation about their common axis and thus maintain the coupling spring in a predetermined angular position within the socket member 14.

The aforesaid base flange 15 of the socket member is secured between the rear and front plates 37, 38, respectively, of a disk-like bottom member which mounts the socket member proper and which is adapted to be affixed to the fuel cell (not shown), or other part to be fastened to the part 10. In the embodiment shown, the two plates 37, 38 of the bottom member are rigidly secured in spaced relation as by means of an inbent rim flange 39 formed on the rear plate 37 which secures an offset flange 40 provided along the periphery of the front plate 38. The spacing between said front and rear plates 37, 38 is such as to accommodate the base flange 15 of the socket member and to frictionally secure said base plate in a relative axial position with respect to the bottom member to which it is adjusted. Such adjustment is permitted by providing the base flange 15 of the socket member with an outside diameter which is substantially less than that of the bottom member, and with recesses 42, 43, 44 in the outer edge of said base flange, in conjunction with pins or dimples 45, 46, 47 formed in the front plate 38 of the bottom member disposed approximately on the outer circle of the base flange 15. The described arrangement permits the socket member 14 to be shifted laterally with respect to the bottom member a limited amount determined by contact of the edges of the flange recesses 42, 43 and 44 with the dimples 45, 46, 47, as required to align the axis of the socket member with the fixed axis of the stud member 11, said arrangement also permitting limited angular turning of the socket member with respect to the bottom member on which it is carried.

The cylindrical body of the socket member 14 has stepped diameter to provide a small diameter portion 48 adjacent its top plate 16, and preferably a flaring diameter portion 49 which connects the small diameter portion 48 with the larger diameter bottom portion 18 of the socket member. The internal diameter of the upper small diameter socket portion 48 closely corresponds to the outer diameter of the coupling spring 26 in the normal or unstressed state of the latter, which it assumes when seated in the stud groove 12. Hence, when the coupling ring 26 is contained in the small diameter portion 48 of the socket, it is confined against radial spreading movement, either accidentally or otherwise. However, it will be observed that as the coupling spring 26 moves into the flaring diameter portion 49 or the larger diameter bottom portion of the socket member, it may be spread radially, as is required in assembly and disassembly of the stud and socket members. Normally, the coupling spring 26 is maintained in the small diameter portion 48 of the socket member by means of a spring 51 reactive between the rear plate 37 of the bottom member and the base 22 of the supporting member 21. As seen in Fig. 2, the spring 51 is preferably a curved leaf spring having upright prongs 52, 53 which embrace the side edges of said base member 22, thus to secure the spring against dislocation within the socket member.

To provide for lateral separation of the stud and socket members, the socket member is provided in its side wall with a slot 54 which communicates with the central opening 17 provided in its top plate 16. The slot 54 has width corresponding to the diameter of the stud member 11, whereby the latter may move laterally through the slot when disassembly is required. By reference to Fig. 1, it will be observed that the gap between the open ends of the coupling spring 26 is disposed in register with the slot 54 in which it is maintained by the aforesaid arms 33, 34 whereby, upon the coupling spring being conditioned to spread, the stud may be withdrawn from the coupling spring, whose normal inner diameter, it is to be understood, is less than the diameter of the bottom of the stud groove 12.

The operation of assembling and disassembling the fastener parts aforesaid is as follows: In the assembly operation, the conical point of the stud member 11 is registered with the central opening 17 of the socket member 14, and said members are pressed together. Normally, the coupling spring 26 is urged into the small diameter portion 48 of the socket member by the spring 51. However, relative axial movement of stud and socket members pushes the coupling spring 26 into the larger diameter portions 49 or 18 of the socket member where it may spread by action of the conical stud point against its inner edge, such lowering movement of the coupling spring also resulting in its seating in the stud groove 12 with a snap action. Upon release of the assembling pressure, the coupling spring 26 returns to its initial position within the small diameter portion 48 of the socket member, whose internal wall functions as a confining ring or shoulder which prevents accidental spreading of the coupling spring, with the result that the latter exercises its locking function in securing the stud and socket members together. To disassemble said members, the stud and socket members are moved axially towards one another, as in the assembly operation, until the coupling spring 26 again lowers into the larger diameter portions 49 or 18 of the socket member wherein it is free to spread. Thereupon, the stud and socket members are moved laterally of one another in the direction of the slot 54, such movement resulting in the stud member spreading the locking spring and thence emerging through the slot 54, whereupon the complete separation of stud and socket members results.

Without further analysis it will be appreciated that a separable fastener according to the invention achieves the desirable objectives set forth in the foregoing. Although sufficiently strong to withstand considerable axial thrust and twisting forces, the fastener is characterized by lightness in weight, its assembly and disassembly can be effected in the simplest possible manner, and from within the interior of a fuel cell or tank which is mounted on the fixed fuselage or frame of an airplane. The invention also provides simple means of adjusting a socket member as may be required to bring its axis into alignment with the fixed axis of a companion stud member, as well as in angular direction, which latter feature is desirable in fasteners for assemblies mounted in confined spaces.

As many changes could be made in carrying out the above constructions without departing from the scope of the invention, it is intended that all matter contained in the above description or shown in the accompanying drawings shall be interpreted as illustrative and not in a limiting sense.

I claim:

1. In a separable fastener, a stud member having a circular groove, a socket member having a central opening for receiving said stud member and a side opening in communication with said central opening for passage of the stud member therethrough, a coupling spring contained in said socket member and normally seating in said groove to couple said members together, the coupling spring comprising an open-ended spring annulus having an effective diameter less than that of the stud member, whereby it must be spread to effect its seating as aforesaid, the socket member having greater axial dimension than that of the coupling spring whereby the latter may move axially therewithin, and being formed with a small diameter portion whose internal diameter closely corresponds to the normal outer diameter of the coupling spring and a larger diameter portion, said small diameter portion being adapted to prevent spreading of the coupling spring when the latter is positioned therein, and spring means axially related to said coupling spring and normally urging said coupling spring into said small diameter portion of the socket member but permitting axial movement of said coupling spring into the large diameter portion of the socket member when required to effect coupling and uncoupling of said coupling spring, said coupling spring and side opening being cooperatively arranged so that when the coupling spring is moved into said large diameter portion and uncoupled from the stud member the latter may be separated from the socket member by its movement through the side opening.

2. A separable fastener as set forth in claim 1, wherein said coupling spring is supported from below on a supporting member contained in the socket member and which is disposed intermediate said coupling spring and said spring means.

3. A separable fastener as set forth in claim 2, wherein said supporting member includes a base and tongues extending normally from said base on which the coupling spring rests, said tongues spacing the coupling spring a predetermined distance above said base.

4. A separable fastener as set forth in claim 1, wherein said coupling spring is supported from below on a carrier member having arms projecting upwardly therefrom in the direction of the axis of the socket member and which extend through the coupling spring and into apertures in an end wall of the socket member, thereby to secure the coupling spring against rotation within the socket member.

5. In a separable fastener, a stud member having a circular groove, a socket member having a central opening in an end wall thereof for receiving the stud member, said opening communicating with a slot in the side wall of the socket member having width permitting passage of the stud member therethrough, a coupling spring contained in the socket member and normally seating in said groove, said coupling spring having the form of an open-ended annulus having a gap between its open ends which is disposed in registry with said slot, the internal diameter of said annulus being less than that of the stud member, and the width of said gap being less than the diameter of the groove bottom, whereby the spring must be spread in both the assembly and disassembly of said members, said socket member having axial dimension greater than that of the coupling spring whereby the latter may move axially within the socket member, and being formed with a reduced diameter portion having diameter corresponding substantially to that of said coupling spring when seated and which prevents accidental spreading of the coupling spring, and a larger diameter portion having diameter allowing spreading of the coupling spring when the latter is moved axially thereinto, and spring means operative against said coupling spring normally to maintain said coupling spring positioned in the reduced diameter portion of the socket member and being depressible upon axial contraction of said stud and socket members to permit movement of said coupling spring into the larger diameter portion of the socket member, thereby to permit spreading of the coupling spring as required for both the assembly and disassembly of said members.

6. A separable fastener as set forth in claim 5, wherein said coupling spring is supported from below by a supporting member contained in the socket member intermediate the coupling spring and said spring means, said supporting member being operative to transmit the force of the spring means to said coupling spring.

7. A separable fastener as set forth in claim 5, wherein said coupling spring is supported from below by a supporting member contained in the socket member and disposed intermediate the coupling spring and said spring means, said supporting member including arms extending upwardly through the coupling spring and into apertures in the end wall of said socket member for securing the coupling spring against rotation within the socket member.

8. In a separable fastener, a stud member having a circular groove, a socket member having a central opening in an end wall thereof for receiving the stud member, said opening communicating with a slot in the side wall of the socket member having width permitting passage of the stud member therethrough, a coupling spring contained in the socket member and normally seating in said groove, said coupling spring having the form of an open-ended annulus having a gap between its open ends which is disposed in registry with said slot, the internal diameter of said annulus being less than that of the stud member, and the width of said gap being less than the diameter of the groove bottom, whereby the spring must be spread in both the assembly and disassembly of said members, and means mounting said coupling spring for axial movement within the socket member from a normal position in which it is restrained from spreading to a position in which it may spread the amount required for assembly and disassembly of the stud and socket members.

9. In a separable fastener including stud and socket members, the stud member being affixed to one part to be fastened, the socket member containing a coupling spring for locking the stud member therein and comprising an inverted cup-shaped member having an annular base flange and a central opening in its top wall for receiving the stud member, a bottom member mounting the socket member and being affixed to the other part to be fastened, said bottom member comprising overlying plate members secured along their edges in spaced relation and receiving the base flange therebetween with sufficient friction as normally to secure said base flange against lateral movement with respect to said bottom member, the base flange having lesser diameter than the plate members whereby the base flange and thereby the socket member may be shifted laterally with respect to said bottom member as required to effect axial alignment of the stud and socket members, and means for limiting the aforesaid shifting movement comprising pins extending between said plate members positioned to be engaged by the edges of notches provided along the edge of the base flange.

10. In a separable fastener, a stud member, a socket member having a central opening in an end wall thereof for receiving said stud member inserted axially into said socket member and a side opening in its side wall communicating with the central opening for permitting relative movement of the stud member with respect to and from the socket member, coupling means mounted for axial movement within the socket member and being operative to couple said stud and socket members when positioned adjacent one end of the socket member and being conditioned to permit uncoupling of said stud and socket members when positioned adjacent the other end of the socket member responsively to relative lateral movement of the stud member with respect to the socket member and in the direction of the side opening of the latter, and spring means reactive between the other end wall of the socket member and the coupling means, said spring means normally urging said coupling means towards said one end of the socket member but permitting axial movement of the coupling means to a position adjacent said other end of the socket member.

11. A separable fastener as set forth in claim 10, wherein said coupling means comprises an open-ended spring annulus and wherein said one end of the socket member has diameter corresponding to the outer diameter of the annulus whereby to prevent opening of the annulus when positioned therein, and wherein said other end of the socket member has diameter greater than the outer diameter of the annulus whereby to permit the annulus to open when positioned therein.

HUGO WURZEL.

REFERENCES CITED

The following references are of record in the file of this patent:

UNITED STATES PATENTS

| Number | Name | Date |
|---|---|---|
| 1,169,693 | Swedlund | Jan. 25, 1916 |
| 1,965,115 | Fenton | July 3, 1934 |